Patented Apr. 11, 1939

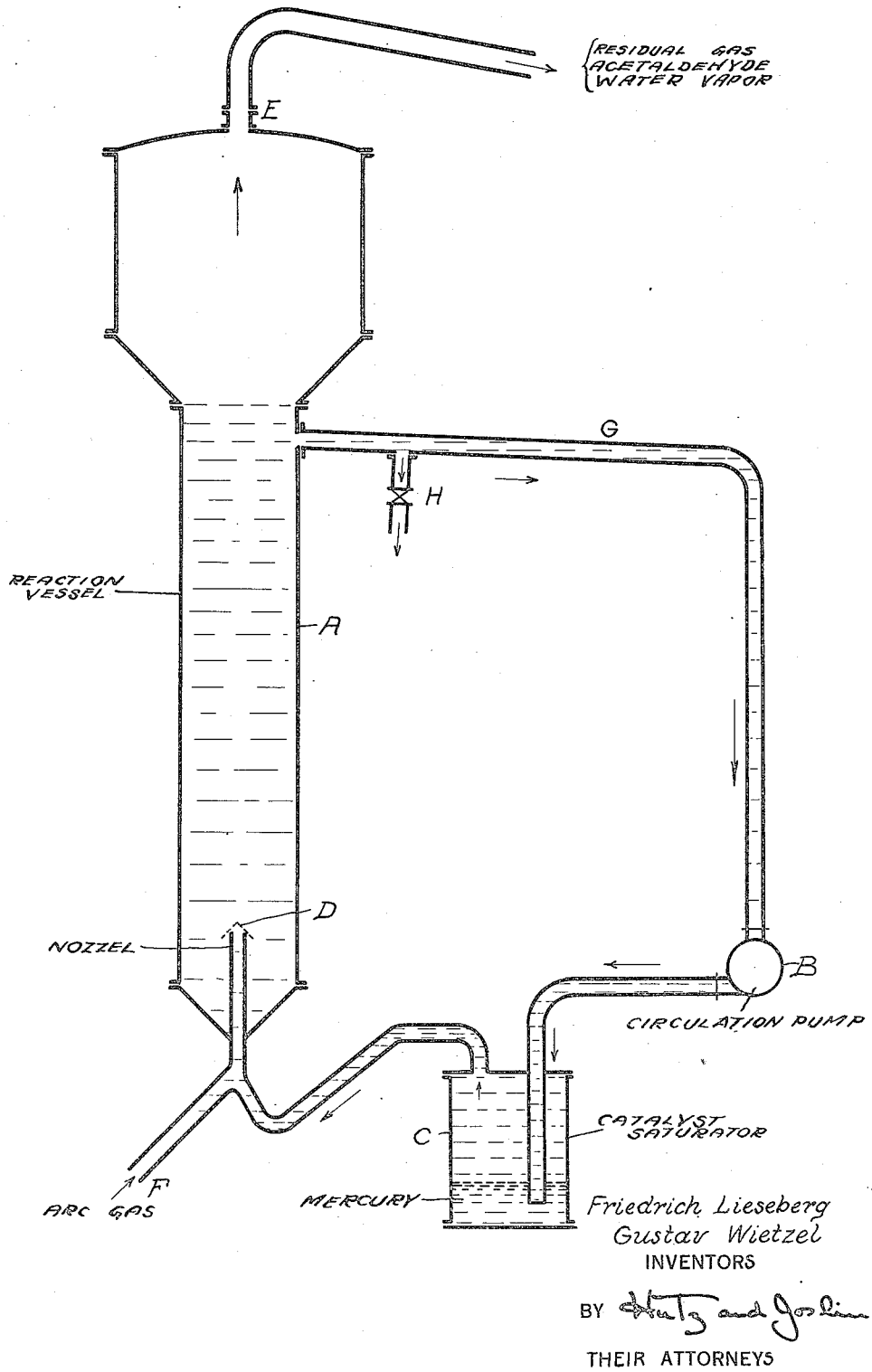

2,153,985

UNITED STATES PATENT OFFICE 2,153,985

PRODUCTION OF ACETALDEHYDE FROM GASES CONTAINING ACETYLENE

Friedrich Lieseberg, Ludwigshafen-on-the-Rhine, and Gustav Wietzel, Mannheim, Germany, assignors to I. G. Farbenindustrie Aktiengesellschaft, Frankfort-on-the-Main, Germany Application September 23, 1937, Serial No. 165,296
In Germany October 30, 1936

2 Claims. (Cl. 260—605)

The present invention relates to the production of acetaldehyde from gases containing acetylene.

In a copending application Ser. No. 83,069, filed June 1936, one of the present inventors has described a process for the production of acetaldehyde from gases containing up to 20 per cent of acetylene, which gases are obtainable by the thermal decomposition of hydrocarbons for example in the electric arc, by means of an acid catalyst solution containing mercury compounds. According to the said invention the gas containing acetylene is led through the reaction vessel in the same direction as the catalytic liquid which latter is led in a cycle, the circulation of the catalytic liquid being preferably such that a multiple of the amount of liquid present in the reaction vessel is circulated per hour. In the said process no pumps are required since the catalytic liquid is circulated by the gas itself which partially forms a foam in the reaction tower having a smaller specific gravity and, thereby, circulates the whole liquid. The acid catalytic liquid in its circulation passes through metallic mercury and, therefore, is always saturated with the necessary amount of mercury salt. In order to produce a good distribution of gas, it is advantageous in the said process to use reaction chambers provided with filler bodies. Provided a gas containing acetylene (electric arc gas) which has been freed from homologues of acetylene and impurities is used, no difficulty is encountered even after working for long periods. The preliminary purification of the electric arc gas, however, rather considerably increases the cost price of the acetylene. If a non-purified electric arc gas be used, however, there are deposited on the filler bodies polymerization products formed from the acetylene homologues and the other impurities during the working up of the gas in the form of a brown-black, solid mass which impairs considerably the passage of the gas through the reaction chamber after some days or weeks.

We have now found that non-purified gases containing up to 20 per cent of acetylene, such as are obtained by treating hydrocarbons in the electric arc can also be worked up without trouble into acetaldehyde by using a reaction vessel free from filler bodies and introducing the gas containing acetylene in a finely dispersed state through a nozzle into the catalytic chamber the gas being led in the same direction as the catalytic liquid while the latter is led in a cycle at the same time.

The fine dispersion of the gas in the catalytic liquid is achieved in a specially advantageous manner by first mixing the gas and the liquid together and forcing the mixture thus obtained and containing more or less large bubbles under pressure through narrow openings as, for example, slits usually having a breadth of from 0.3 mm. to 2 mm. and preferably of from 0.5 mm. to 1.5 mm. Upon pressing the liquid through these openings the large bubbles are reduced to fine bubbles. Instead of slit-like openings also small circular openings may be used or any other kind of openings which are suitable for finely distributing the gas bubbles within the catalytic liquid. In this process, however, contrasted with the process according to the said application Ser. No. 83,069, a pump is used for circulating the catalyst solution in order to overcome the resistance of the nozzles.

The catalyst solution used preferably consists of a dilute sulphuric acid solution containing mercury and iron sulphates. Preferably between 20 and 100 grams of iron per litre are employed in the form of ferric and ferrous sulphate, more than 20 per cent of the iron being present in the trivalent stage. The saturation of the sulphuric acid solution of iron salt with mercury salt is preferably effected by leading the solution through a vessel charged with mercury which is preferably arranged on the pressure side of the liquid pump used for circulating the catalyst solution.

The process according to our present invention permits a working up of non-purified electric arc acetylene into acetaldehyde which is practically unlimited as regards time because the solid bodies formed in the reaction vessel free from filler bodies by the polymerization of homologues of acetylene and other impurities are continuously withdrawn with the catalyst solution and thus removed. By dispensing with the purification of the acetylene not only are the production costs of the electric arc gas reduced, but the loss of acetylene amounting up to 10 per cent occurring during the purification of the gas is avoided also.

The manner in which the present process may be carried out in practice will be further described with reference to the accompanying drawing which shows an example of apparatus according to this invention but the invention is not restricted to the particular example shown.

A catalyst solution containing 50 grams of free sulphuric acid and 35 grams of iron in the form of ferrous and ferric sulphate, at least 20 per cent of the iron being present in the ferric stage, is charged into a unit consisting of a reaction vessel A, as for example a reaction tower, a circulating pump B, a vessel C containing mercury arranged on the pressure side of the pump B and a nozzle D. The catalyst solution is caused by the pump B to circulate at such a speed that the liquid contained in the reaction vessel is changed several times per hour. The solution is thus saturated with mercury compounds of the mercurous and mercuric stages by the reaction of the metallic mercury with the ferric sulphate. The solution is kept at a temperature of 90° C. by indirect heating or by blowing in steam. Through the gas supply pipe F, non-purified electric arc gas is then pressed into the catalyst solution flowing to the nozzle D after passing which it enters the reaction vessel A in a state of fine dispersion. It passes through the reaction vessel in the same direction as the catalyst solution. The main portion of the catalyst solution passes from the reaction vessel A through a pipe G, the pump B and the mercury-saturator C back into the reaction chamber A. A part of the solution is withdrawn through a pipe H and freed by centrifuging or sedimentation from the polymerization products of homologues of acetylene and other impurities of the electric arc gas contained therein in the form of sludge. The ferrous salt is then oxidized to ferric salt and the solution returned to the cycle of the catalyst solution. The amount of solution withdrawn at H for the purpose of oxidation is adjusted so that at least 20 per cent of the total iron in the solution is always present in the ferric stage. The residual gas together with the acetaldehyde and water vapor formed escapes from the reaction vessel A through a pipe E. The acetaldehyde is recovered therefrom by washing with water. The acetylene contained in an amount of from about 18 to 20 per cent in the electric arc gas is converted into acetaldehyde to the extent of about 95 per cent by a single passage through the reaction vessel. Crotonaldehyde and acetic acid are also formed in small amounts. Instead of working at atmospheric pressure, the reaction may also be carried out at pressures higher than atmospheric pressure with equally good results.

What we claim is:

1. In the production of acetaldehyde from gases containing up to 20 per cent of acetylene by means of an acid catalyst solution containing mercury compounds the step which comprises using a reaction vessel free from filler bodies and introducing the gas containing acetylene in a finely dispersed state through a nozzle into the catalytic chamber the gas and the catalytic solution being led in the same direction the catalyst solution being withdrawn from the upper part of the reaction vessel and returned after saturation with mercury compounds to the lower part of the catalytic chamber while causing the catalyst solution to circulate at such a speed that the liquid contained in the reaction vessel is changed several times per hour.

2. In the process according to claim 1 the step which comprises leading the gas containing actylene into the catalyst solution and introducing the mixture of gas and catalyst solution through a nozzle into the catalytic chamber.

FRIEDRICH LIESEBERG.
GUSTAV WIETZEL.